Feb. 19, 1929.

R. DORWARD 1,703,063

EXCAVATOR

Filed Oct. 17, 1927    6 Sheets-Sheet 1

INVENTOR
Raymond Dorward,
BY
Hood & Hahn.
ATTORNEYS

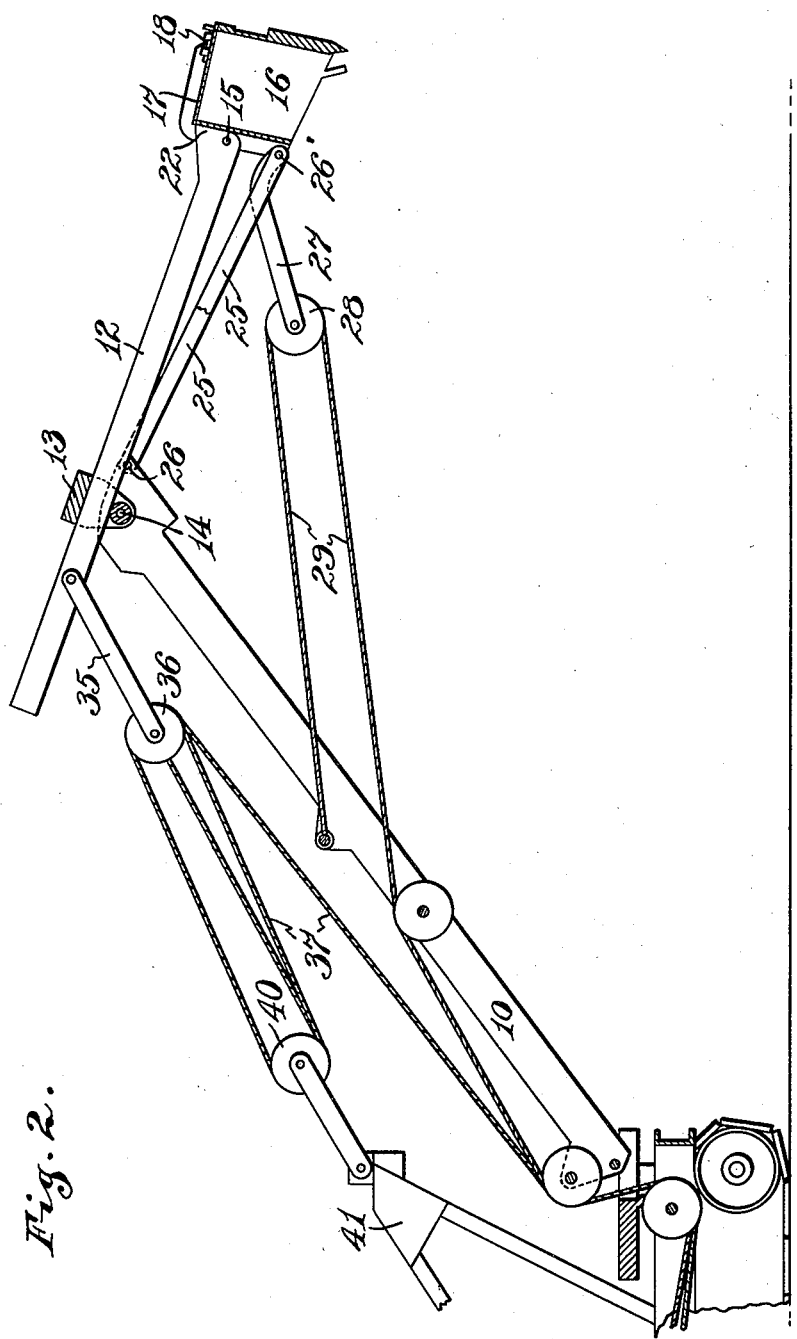

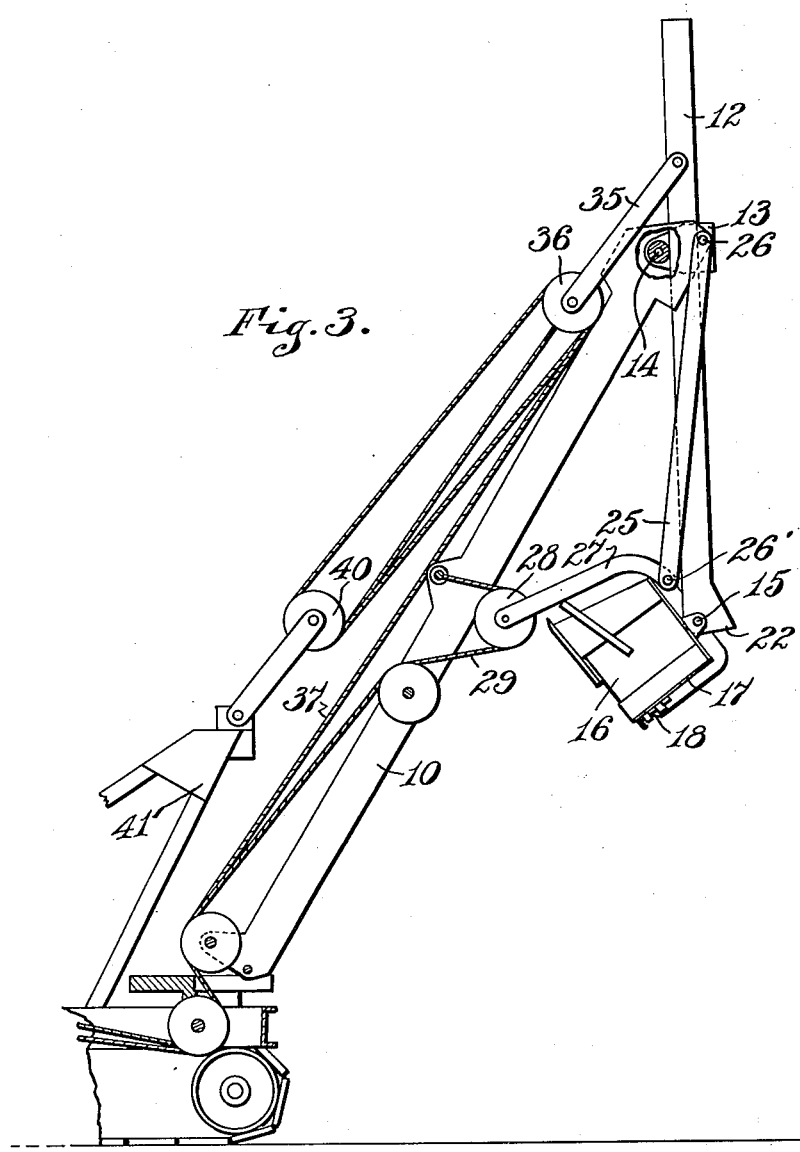

Feb. 19, 1929.  1,703,063
R. DORWARD
EXCAVATOR
Filed Oct. 17, 1927    6 Sheets-Sheet 4
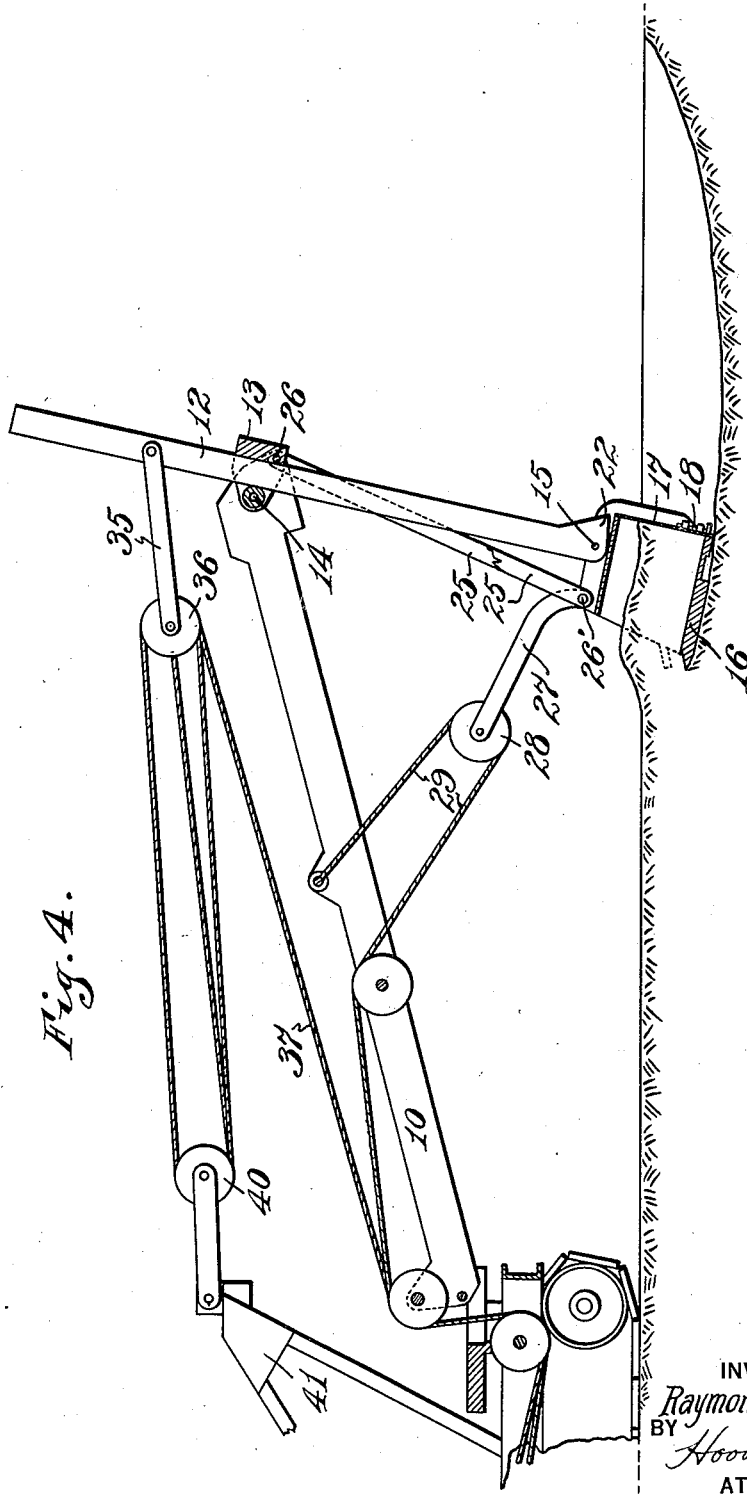
INVENTOR
*Raymond Dorward,*
BY *Hood + Hahn.*
ATTORNEYS

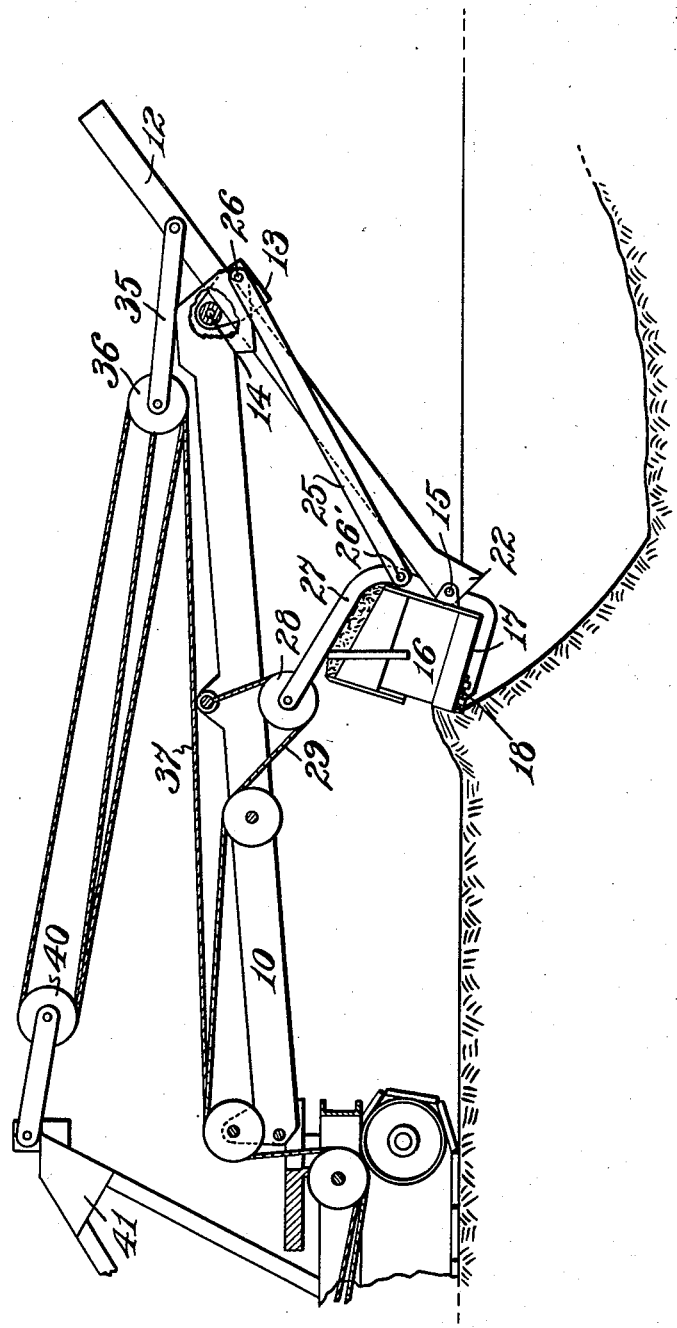

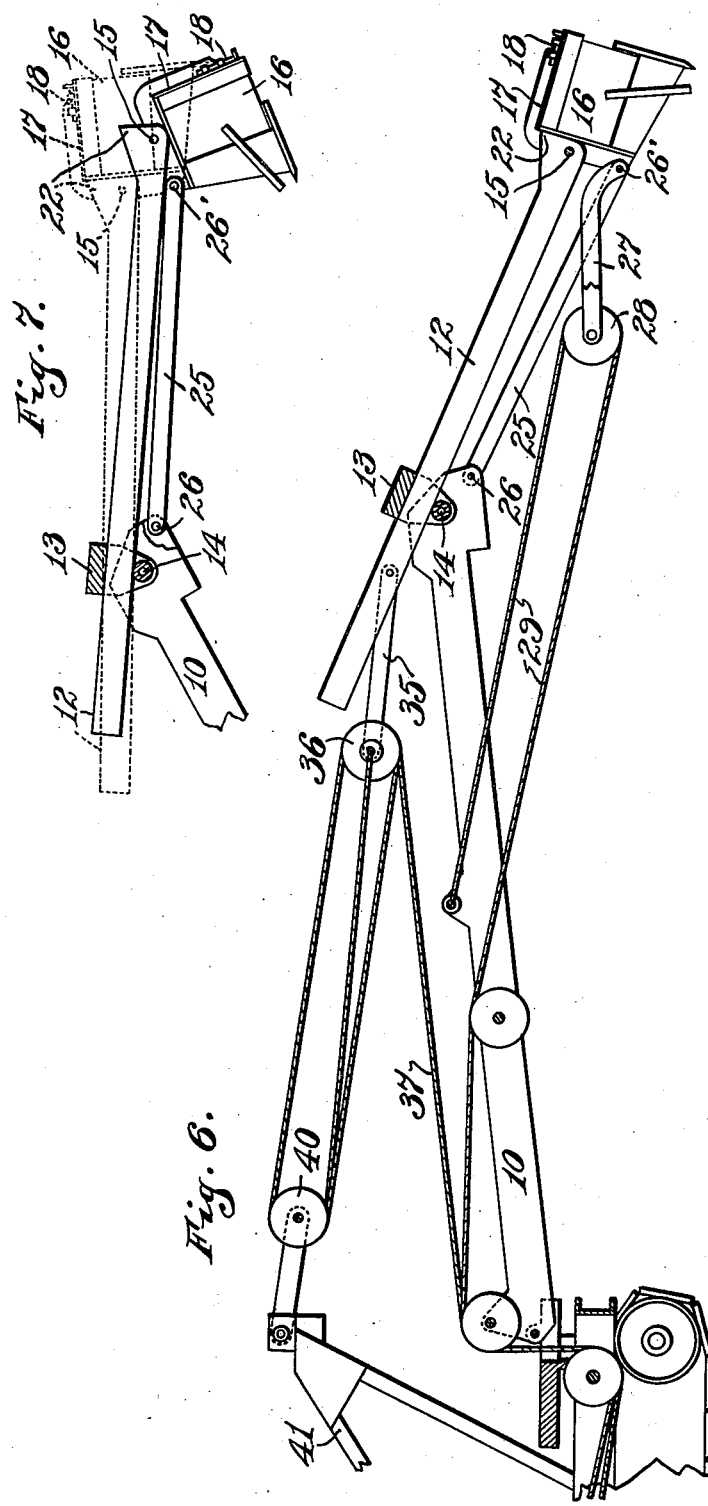

Patented Feb. 19, 1929.

1,703,063

UNITED STATES PATENT OFFICE.

RAYMOND DORWARD, OF INDIANAPOLIS, INDIANA, ASSIGNOR TO INSLEY MANUFACTURING COMPANY.

EXCAVATOR.

Application filed October 17, 1927. Serial No. 226,559.

The object of my invention is to produce an excavator, or so-called ditcher, which may be readily controlled in its various digging and dumping operations.

The accompanying drawings illustrate my invention.

Fig. 2 is a diagrammatic view with the parts in position to excavate at a high level.

Figure 1:
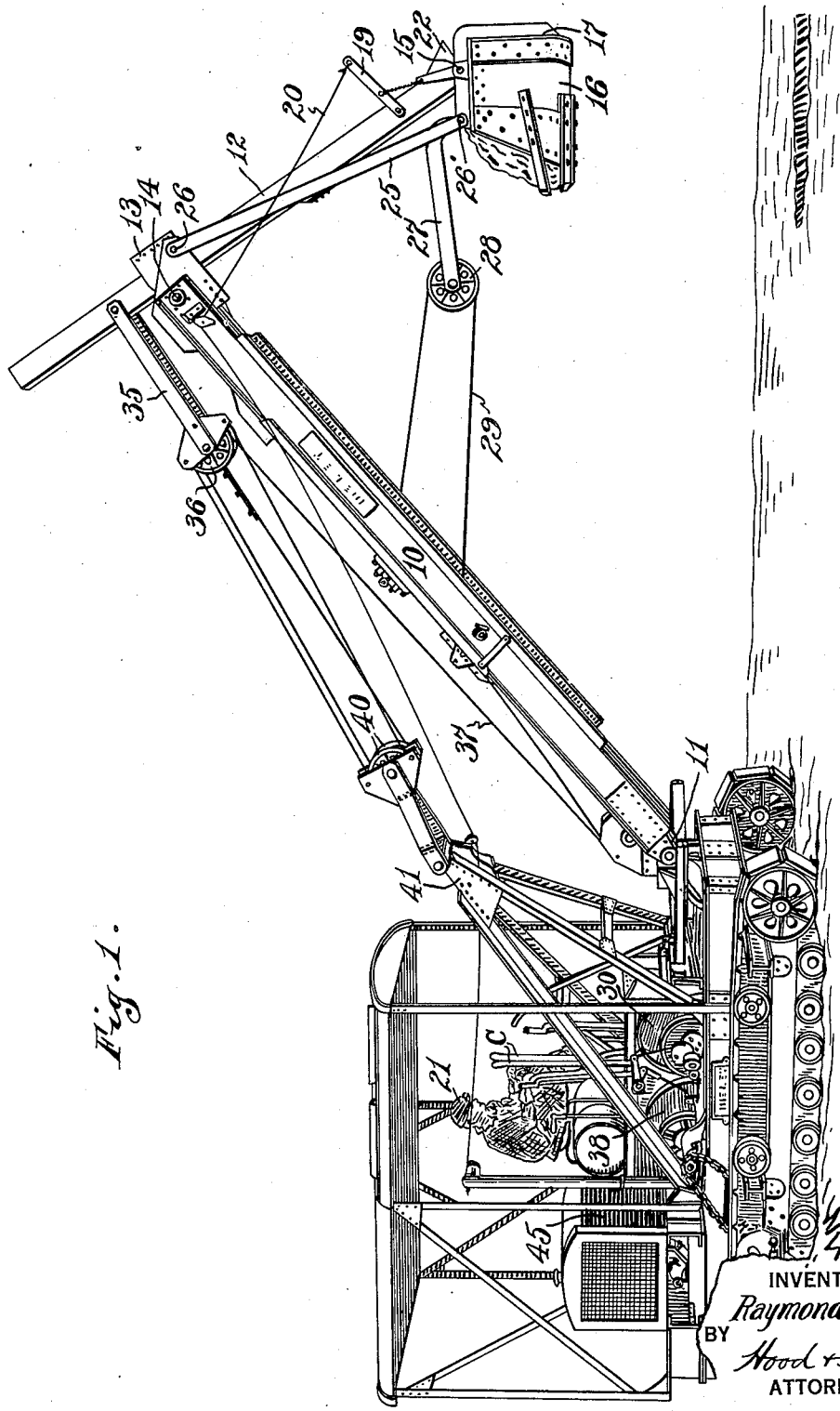
Fig. 1 is a perspective view of an apparatus embodying my invention with the dipper loaded and on its way to dumping position.

Fig. 3, a diagrammatic view of the parts in position for bottom dumping.

Fig. 4, a diagrammatic view with the parts in shallow excavating position.

Fig. 5, a diagrammatic view showing the parts in position at the end of a shallow excavation movement.

Fig. 6, a diagrammatic view showing the parts in position at the beginning of a shallow excavating movement, and Fig. 7, a diagrammatic view showing the parts in position for front end dumping.

In the drawings 10 indicates the main boom of my apparatus supported at its lower end upon a swivel 11. Pivotally and slidably mounted at the outer end of boom 10 is a dipper arm 12. The pivotal and slidable mounting may be secured in any desired manner illustrated diagrammatically in the drawings by a yoke 13 pivoted on boom 10 at 14 and so formed that the dipper arm 12 may slide therein. Pivoted at 15 to the lower end of dipper arm 12 is a dipper 16 so formed at its forward open end as to be capable of an excavating action. The rear end of dipper 13 may be closed by a hinged end 17 hinged at its upper end and latched at its lower end by a latch 18 controlled by a lever 19 to which is connected a control line 20 leading back to a point closely adjacent the operator 21. The precise details of this hinged end enclosure form no part of my present invention beyond the fact that a hinged end gate for the scraper bucket is many times desirable and is useful in my improved structure. Swing of dipper 16 in the outward direction on dipper arm 12 is limited by the toe 22 of said arm. The pivotal connection 15 is conveniently to the rear of the middle of the dipper and pivoted to the dipper at a point in front of the pivotal connection 15 are two control links 25—25, one upon each side of the dipper arm 12, said control links being pivotally connected, at 26, to the outer end of boom 10 at a point beyond the pivotal connection 14.

Pivoted to dipper 16, conveniently upon the pivot pin 26' at the lower end of links 25—25, is a pull bar 27 carrying a sheave 28. Passing over sheave 28 is a cable 29 leading to a winding drum 30 under the control of the operator 21.

Pivotally connected to the dipper arm 12 at a point above yoke 13, is a pull frame 35 provided with sheaves 36. A cable 37 leading from a winding drum 38 within the control of operator 21, passes over sheaves 36 and sheaves 40 supported from frame 41, as shown, in such manner that pull upon cable 37 will simultaneously tend to lift the outer end of boom 10 and to swing the lower end of dipper arm 12 outwardly and upwardly and, depending upon the angular position of the dipper arm 12 relative to boom 10, may tend to shift the dipper arm 12 lengthwise in one direction or the other.

The winding drums 30 and 38 will be driven by suitable motor 45 and controlled by the usual control levers C these parts being indicated diagrammatically because, in general construction, they are well known and the details form no part of my present invention. The relative lengths of dipper arm, control links, points of attachment thereof to the dipper, the point of attachment of the pull frame 35 to the dipper arm, etc., will, of course, vary, depending upon the length of the boom 10, the depth to which excavation is to be carried, the height at which dumping is to be accomplished, etc., and it is manifestly impossible to state these proportions with any degree of particularity except to say that the points of attachment of the lower end of the dipper arm and control links to the dipper, the point of attachment of the upper end of the control links to the boom relative to the pivotal and sliding support of the dipper arm, and the point of attachment of the pull frame 35 to the dipper arm should be such that, when the dipper arm is extended, as shown in Fig. 7, and for a considerable distance adjacent that position, a pull on cable 37 provides a distinct tendency to draw the dipper arm inwardly through its yoke, and when the parts near the position shown in Fig. 5 a pull on cable 37 will provide a distinct tendency to shift the dipper arm 12 outwardly through its supporting yoke.

In operation a pull on cable 29 tends to draw the dipper toward the power plant, swinging the dipper arm and control links on the boom, and pull on cable 37 tends, in general, to swing the lower end of the dipper arm outwardly and to raise the boom 10. The operator, by properly coordinating the slackening or tightening of the two cables 29 and 37 may manipulate the dipper through its possible outward and inward movements at any desired elevation or depression so that desired excavation may be accomplished at any point within the range of the apparatus and the loaded dipper may be dumped. During the inward or excavating movements the pull of cable 29 tends to swing the dipper forward relative to the dipper arm and the control links. As the dipper nears the extreme of its inward excavating movement the effect of the pull of cable 37 upon the dipper arm 12 as to its possible longitudinal movement, is reversed so that the dipper arm is moved downwardly through its yoke thereby swinging the dipper upon pivot 26' so as to move the open end of the dipper upwardly. As a consequence the load is more readily retained in the dipper and the parts may be brought to a position, as indicated in Fig. 3, where the rear end of the bucket is well depressed so that dumping may be accomplished from the rear end of the bucket by a release of its rear door 17.

On the other hand, in the outward movement of the dipper, accomplished by a pull upon cable 37 and the slacking off of cable 29, the pull on cable 37 for a major portion of the movement has a force tending to raise the outer end of the boom 10 and/or a swing of the dipper arm on the boom, the controlling links 25 serving to substantially limit the swing of the dipper as compared to the drum so that the dipper is capable of retaining its load until it has reached a considerably elevated and outwardly extended position at which time the angle of the dipper arm 12 relative to the boom 10 is such that a sufficient component of force rearwardly on the dipper arm 12 is developed to slide said dipper arm rearwardly through its yoke 12 and thus suddenly flip the dipper from the position shown in full lines in Fig. 7 to the position shown in dotted lines in said figure so that the load in the dipper may be quickly spilled from the front end.

I claim:—

1. An excavator comprising a boom, a dipper handle pivotally mounted on the boom, a dipper pivotally connected to the lower end of the dipper arm with its mouth directed toward the boom, a control link pivotally connected to the dipper near the mouth thereof and pivotally connected to the boom adjacent the dipper arm support, a pull line connected to the dipper to pull the same toward the boom, and a pull line connected to the upper end of the dipper arm above the boom to swing the dipper away from the boom.

2. An excavator comprising a boom, a dipper handle pivotally and slidably mounted on the boom, a dipper pivotally connected to the lower end of the dipper arm with its mouth directed toward the boom, a control link pivotally connected to the dipper near the mouth thereof and pivotally connected to the boom adjacent the dipper arm support, a pull line connected to the dipper to pull the same toward the boom, and a pull line connected to the upper end of the dipper arm above the boom to swing the dipper away from the boom, said last mentioned pull line being so supported that when the dipper is near the boom the pull line will slide the dipper arm downwardly and when the dipper arm is projected the pull line will retract the dipper arm.

3. An excavator comprising a boom, a dipper handle pivotally mounted on the boom, a dipper pivotally connected to the lower end of the dipper arm, a control link pivotally connected to the dipper near the mouth thereof and pivotally connected to the boom adjacent the dipper arm support, a pull line connected to the dipper to pull the same toward the boom, and a pull line connected to the upper end of the dipper arm above the boom to swing the dipper away from the boom.

4. An excavator comprising a boom, a dipper handle pivotally and slidably mounted on the boom, a dipper pivotally connected to the lower end of the dipper arm, a control link pivotally connected to the dipper near the mouth thereof and pivotally connected to the boom adjacent the dipper arm support, a pull line connected to the dipper to pull the same toward the boom, and a pull line connected to the upper end of the dipper arm above the boom to swing the dipper away from the boom, said last mentioned pull line being so supported that when the dipper is near the boom the pull line will slide the dipper arm downwardly and when the dipper arm is projected the pull line will retract the dipper arm.

In witness whereof, I, RAYMOND DORWARD, have hereunto set my hand at Indianapolis, Indiana, this 14th day of October, A. D., one thousand nine hundred and twenty-seven.

RAYMOND DORWARD.